(12) United States Patent
Andres et al.

(10) Patent No.: US 6,545,373 B1
(45) Date of Patent: Apr. 8, 2003

(54) SYSTEM AND METHOD FOR PROVIDING BALLAST LOADING FOR A TURBO-GENERATOR

(75) Inventors: Mike Andres, Rockford, IL (US); Terry Temple, Stillman Valley, IL (US); Daniel E. Brady, Roscoe, IL (US)

(73) Assignee: Smiths Aerospace, Inc., Loves Park, IL (US)

( * ) Notice: Subject to any disclaimer, the term of this patent is extended or adjusted under 35 U.S.C. 154(b) by 0 days.

(21) Appl. No.: 09/939,236

(22) Filed: Aug. 24, 2001

(51) Int. Cl.$^7$ ................................................. H02P 9/04
(52) U.S. Cl. ............................. 290/52; 322/37; 60/660
(58) Field of Search ........................ 290/52, 40 R, 290/40 C; 322/20, 36, 37; 60/660, 685

(56) References Cited

U.S. PATENT DOCUMENTS

| | | | | |
|---|---|---|---|---|
| 3,724,214 A | * | 4/1973 | Bryant | 60/685 |
| 4,005,581 A | * | 2/1977 | Aanstad | 60/660 |
| 4,302,715 A | * | 11/1981 | Putman et al. | 323/210 |
| 4,311,253 A | * | 1/1982 | Putman et al. | 322/25 |
| 4,455,614 A | * | 6/1984 | Martz et al. | 700/288 |
| 6,265,786 B1 | * | 7/2001 | Bosley et al. | 290/52 |
| 6,274,945 B1 | * | 8/2001 | Gilbreth et al. | 290/52 |
| 6,355,987 B1 | * | 3/2002 | Bixel | 290/52 |
| 6,410,992 B1 | * | 6/2002 | Wall et al. | 290/52 |
| 2002/0140234 A1 | * | 10/2002 | Walls et al. | 290/52 |

* cited by examiner

*Primary Examiner*—Nicholas Ponomarenko
(74) *Attorney, Agent, or Firm*—Leydig, Voit & Mayer, Ltd.

(57) ABSTRACT

A ballast load control system and method is presented that regulates the output electrical power supplied by a turbo-generator such that appropriate turbine loading may be achieved. Such enables the use of a turbo-generator having an expansion turbine to be used to provide a controlled, required amount of cooling to a thermal control system. By effectively varying the coupled electrical load, the loading provided to the expansion turbine may be controlled while maintaining output power requirements to connected electrical utilization equipment. Use of a common system controller for both the cooling system and ballast trim load system of the present invention ensures coordinated operation between the required amount of cooling and electrical power quality supplied to the coupled utilization equipment.

25 Claims, 4 Drawing Sheets

SYSTEM AND METHOD FOR PROVIDING BALLAST LOADING FOR A TURBO-GENERATOR

FIELD OF THE INVENTION

The present invention relates generally to turbo-generators, and more particularly to control mechanisms and methods to provide balanced loading for a turbo-generator's turbine.

BACKGROUND OF THE INVENTION

The use of electronics and electronic equipment in modern aircraft, and in particular modern jet fighter aircraft, continues to increase. Flight control computers, communications equipment, radar equipment, electronic defense systems, electronic targeting systems, etc. all require electric power to operate. Indeed, some of these systems require an exceedingly large amount of electric power to perform their function. Unfortunately, along with high power consumption comes high heat generation and dissipation.

While dealing with high heat generation is troublesome in any system, airborne applications present additional, unique challenges to this problem. Specifically, the complexity of control and sophistication of the electronics on modern aircraft are particularly susceptible to high operating temperatures, and therefore it becomes crucial to provide cooling so that these sophisticated electronics may continue to operate reliably. Further, since each additional pound of weight translates directly to increased fuel burn and therefore decreased range, the electronic subsystems are designed to be as compact and lightweight as possible. Such compact, lightweight design results in increased power densities among the electronic components. Unfortunately, devices with this increased power density typically have a much reduced surface area from which the heat may be removed. As the processing speed of these components increases, the increased switching rate multiplies the switching losses inherent in the devices such that the temperature rise becomes significant over the same period of time as compared to a slower processing component. Unfortunately, despite the fact that all of these factors combined to require a much larger capacity cooling system, the relationship between increased weight and reduced range for an aircraft counters the desirability of adding larger cooling systems.

In an attempt to meet the increased cooling requirements driven by the sophistication, size, and power density of the modern electronic equipment, some systems have reverted to the use of ram air cooling of the electronic components. Unfortunately, the introduction of ram air into the aircraft increases the drag on the aircraft, and therefore reduces the effective range of that aircraft proportionally. While self-contained liquid cooling systems may be used to adequately remove the heat generated by the electronic components, the weight and complexity of such systems provides a disincentive for their use. However, to enable the sophisticated electronics to continue to operate, such systems are typically employed, despite the impact on range and fuel consumption. Even in these systems, however, some type of cooling air is often needed to remove the heat from the liquid coolant.

While the initial design of a modern aircraft may take into account the necessary cooling systems to remove the heat generated by the sophisticated modern electronic subsystems included therein, a unique problem is presented by such modern electronics for older, existing air frames. That is, because an airframe has a useful service life of many years or decades, the subsequent development of highly sophisticated electronic subsystems often presents an opportunity to retrofit the existing airframe to provide enhanced functionality and sophistication. Unfortunately, the originally designed cooling system on the older aircraft may not have the capacity to dissipate the heat generated by the newer electronic subsystems. In such cases the retrofit activity must also include a retrofit of the existing cooling system and/or electric power generating system, which often significantly adds to the cost and detracts from the desirability of conducting such retrofit. As with the original design trades, consideration of ram air, liquid, or some other cooling system must take place. Because it is not desirable to allow such retrofits to significantly reduce the range of the existing airframe, such a cooling system must not significantly add to the drag of the aircraft nor add unnecessary weight and complexity to the aircraft. Such design considerations generally preclude the usage of ram air.

One cooling system that is capable of providing the additional cooling required by the usage of modern sophisticated electronics and electronic subsystems uses an expansion turbine driven by a source of gas, such as, e.g., bleed air from the main engine of the aircraft. Such a cooling system operates by directing bleed air from the engine through an expansion turbine to significantly cool the bleed air. This cooled air output from the expansion turbine is then passed across heat exchangers that remove the heat from the electronic components and subsystems to allow them to operate properly. Unfortunately, for the expansion turbine to provide the necessary cooling of the bleed inlet air, the turbine must be loaded. One method known to provide such turbine loading is to couple an electric power generator to the expansion turbine shaft and couple the electric power output to the utilization equipment to supply power thereto. Unfortunately, the required loading on the turbine is primarily driven by the requirement for cooling, not by the electrical needs of utilization equipment.

However, typical turbine driven generator control systems do not operate in a fashion that controls the increase or decrease of generator output to supply a required amount of loading on the turbine to allow the turbine to provide the required amount of cooling. In fact, typical generator controls systems would tend to unload the turbine to maintain output electrical regulation by reducing the excitation of the generator as the turbine sped up to meet an increased thermal demand. This, however, is completely opposite to the achievement of enhanced cooling capacity through the expansion turbine. That is, as an increased flow is demanded by the cooling system, the speed of the turbine will increase. This increase in generator input speed will be compensated by the generator control system by reducing generator excitation in an attempt to maintain the same output power to the connected utilization equipment. Furthermore, operation of the utilization equipment may well result in the expansion turbine being unable to meet its cooling requirement on a steady state basis. That is, if the utilization equipment powered from the turbine driven generator is reduced based on the utilization equipment operating profiles, this will in turn reduce the loading of the expansion turbine, which will result in a proportional reduction in the ability of the expansion turbine to cool the engine bleed air. This will, in turn, reduce the ability of the expansion turbine to provide the required cooling for which it was designed.

In view of these significant problems, expansion turbine driven generators, also known as turbo-generators, are not typically used to provide cooling despite the apparent advantages of its size, weight over other systems.

There exists, therefore, a need in the art for a system that coordinates the turbine loading provided by an electrical generator with the cooling requirements for which it is installed.

BRIEF SUMMARY OF THE INVENTION

In view of the above, it is an object of the present invention to provide a new and improved ballast loading system and method. More specifically, it is an object of the present invention to provide a new and improved ballast loading system and method for a turbo-generator that provides relatively consistent, balanced loading on the turbine. When such a system as presented by the present invention is utilized in an application that requires the turbo-generator to supply cooling through the turbine and electric power from the generator, consistent turbine loading to meet the cooling requirements is provided by the generator ballast loading system, which also switches the flow of such electric power from the ballast system to utilization equipment on demand.

Preferably, the ballast loading control system regulates the amount of ballast loading to meet the cooling requirements of the system in coordination with the electrical power requirements of the utilization equipment. Coordination of ballast electrical loading is also maintained in one embodiment based on the turbine inlet airflow control system. In applications that use bleed air from a main engine turbine, coordination is accomplished with the bleed control valves. In applications that use another source of gas, coordination is accomplished with the gas control valves or other mechanism that controls the flow of gas to the turbine.

The ballast loading control system and method operates in one embodiment to maintain a consistent output voltage to the utilization equipment. This control function is accomplished regardless of the speed at which the turbine drives the generator, above a minimum speed. In embodiments wherein the generator is a permanent magnet machine whose unloaded output voltage characteristic is directly proportional to its speed, the ballast loading control system operates to increase an amount of electrical load on the generator as the speed increases, and decrease an amount of electrical load as the speed decreases. In this way the voltage seen by the utilization equipment is relatively constant.

Control of the ballast electrical loading varies depending on the type of ballast load used. In one embodiment of the present invention, the ballast load is a single resistive load to which power flow is controlled in a pulse-width modulated (PWM) fashion. In an alternate embodiment, the ballast load element includes a bank of resistive elements that are switched in and out of circuit as needed to supply the requisite ballast load. The impedance of the trim elements may also include reactive components as desired to compensate for reactive elements of the utilization equipment. Further, the power from the generator may also be directed to perform useful work, such as charging batteries, driving auxiliary mechanical loads, supplementing the main electrical system, etc.

The control strategy in one embodiment looks only to the output voltage of the generator to determine the amount of ballast loading needed. In an alternate embodiment, coordination of the ballast loading with the gasflow control valves is accomplished. Further, an alternate embodiment of the ballast loading control coordinates operation with other electrical loads supplied by the turbine-driven generator such that power is freely available to the other electrical loads on demand. That is, as power is needed by the other electrical loads, the ballast control system reduces the ballast loading in proportion to the increase in other electrical load demand such that the output voltage of the generator remains relatively constant.

In one embodiment of the invention, a method of providing controlled turbine loading in a turbo-generator based cooling system is provided. This method comprises the steps of monitoring an output voltage of the turbo-generator, and selectively coupling a ballast load to an electrical output of the turbo-generator to maintain the output voltage at a predetermined level. Preferably, the step of selectively coupling the ballast load comprises the step of increasing the ballast load in response to an increase in the output voltage of the turbo-generator. In an embodiment wherein the ballast load comprises a plurality of parallel coupled ballast load elements, the step of increasing the ballast load comprises the step of coupling at least one additional ballast load element to the electrical output of the turbo-generator. Alternatively, in an embodiment wherein the step of selectively coupling the ballast load comprises the step of pulse-width modulating at a duty cycle the coupling of the ballast load to the electrical output, the step of increasing the ballast load comprises the step of increasing the duty cycle of the pulse-width modulated coupling.

In one embodiment the step of selectively coupling a ballast load comprises the step of decreasing the ballast load in response to an decrease in the output voltage of the turbo-generator. In a system in accordance with the present invention wherein the ballast load comprises a plurality of parallel coupled ballast load elements, the step of decreasing the ballast load comprises the step of disconnecting at least one of the ballast load elements from the electrical output. In an embodiment wherein the step of selectively coupling the ballast load comprises the step of pulse-width modulating at a duty cycle the coupling of the ballast load to the electrical output, the step of decreasing the ballast load comprises the step of decreasing the duty cycle of the pulse-width modulated coupling.

In accordance with an alternate embodiment, the step of selectively coupling the ballast load comprises the step of decreasing the ballast load in response to an increase in power demand from the turbo-generator by the utilization equipment coupled to the turbo-generator. Alternatively, the step of selectively coupling the ballast load comprises the step of increasing the ballast load in response to a decrease in power demand from the turbo-generator by utilization equipment.

In yet a further embodiment of the method of the present invention, the step of selectively coupling the ballast load comprises the step of increasing the ballast load in response to an increase in air flow to a turbine of the turbo-generator. Alternatively, the step of selectively coupling the ballast load comprises the step of decreasing the ballast load in response to a decrease in air flow to a turbine of the turbo-generator.

A ballast load system for use with a turbo-generator having a gas driven turbine drivably coupled to an electric generator, which produces an electrical output upon operation of the turbine is also presented. In this embodiment of the invention, the system comprises a ballast load module, and a control module having an input for receiving the electrical output of the generator and an output coupled to the ballast load module. A system controller having a first sensory input to sense the electrical output of the generator is also included. This system controller commands the control module to selectively couple the ballast load module to the input to vary an electrical load connected to the generator in order to maintain the electrical output of the generator at a predetermined level.

In one embodiment of the ballast load system of the invention, the ballast load module comprises a plurality of parallel load elements. In this embodiment the control module comprises a plurality of parallel switching elements associated with the plurality of parallel load elements. During operation, the system controller commands the control module to close at least one additional switching element in response to an increase of voltage level of the electrical output. Alternatively, the system controller commands the control module to open at least one switching element in response to a decrease of voltage level of the electrical output.

In an alternate embodiment of the ballast load system of the invention, the ballast load module comprises a single load element. In this embodiment the control module comprises a controllable switching element that the system controller pulse-width modulates to effectively vary the electrical load connected to the generator. During operation the system controller increases a duty cycle of the pulse-width modulation of the controllable switching element in response to an increase of voltage level of the electrical output. Alternatively, the system controller decreases a duty cycle of the pulse-width modulation of the controllable switching element in response to a decrease of voltage level of the electrical output.

In a further embodiment of the present invention, the systems controller further includes a sensory input to sense an amount of gas to the turbine. In this embodiment the system controller commands the control module to selectively couple the ballast load module to the input to vary the electrical load connected to the generator in proportion to the amount of gas to the turbine. In an alternate embodiment, the control module further includes an output adapted to supply electrical power to utilization equipment. The system controller in this embodiment commands the control module to vary the electrical load in inverse proportion to the electrical power supplied to the utilization equipment.

A still further embodiment of the present invention presents a cooling and electric power generation system. This system comprises a turbo-generator having a gas driven turbine drivably coupled to an electric generator. The electric generator produces an electrical output upon operation of the turbine, and the turbine reduces the temperature of the gas. The system includes a ballast load module, and a control module having an input for receiving the electrical output of the generator, an output coupled to the ballast load module, and an output adapted to couple to utilization equipment. The system also includes a system controller having a sensory input to sense the electrical output of the generator. This system controller commands the control module to selectively couple the ballast load module to the input to vary an electrical load connected to the generator to maintain the electrical output of the generator at a predetermined level.

In one embodiment of this system, an input gas modulating valve is also included. The system controller controls this modulating valve to vary an amount of cooling provided by the turbine, and commands the control module to vary the electrical load in proportion to the variation of the amount of cooling provided by the turbine.

In accordance with an embodiment of the invention, the system controller commands the control module to vary the electrical load in inverse proportion to an amount of electric power drawn by the utilization equipment. In an embodiment wherein the ballast load module comprises a plurality of parallel load elements, the control module comprises a plurality of parallel switching elements associated with the plurality of parallel load elements. In an embodiment wherein the ballast load module comprises a single load element, the control module comprises a controllable switching element. The system controller in this embodiment pulse-width modulates the controllable switching element to effectively vary the electrical load connected to the generator.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In an embodiment of the present invention, the ballast loading system and method find particular applicability to an airborne cooling and power system for use on fighter aircraft. However, one skilled in the art will recognize that, while such an application presents significant technical challenges that are overcome by the present invention, the system of the present invention may find application in other airborne, ground based, and water vessel applications. Therefore, in the description that follows the system of the present invention will be presented with regard to only one application in the interests of brevity and clarity of discussion. However, such an application and the embodiments discussed with regard thereto should be taken by way of example only, and not by way of limitation.

Figure 1:
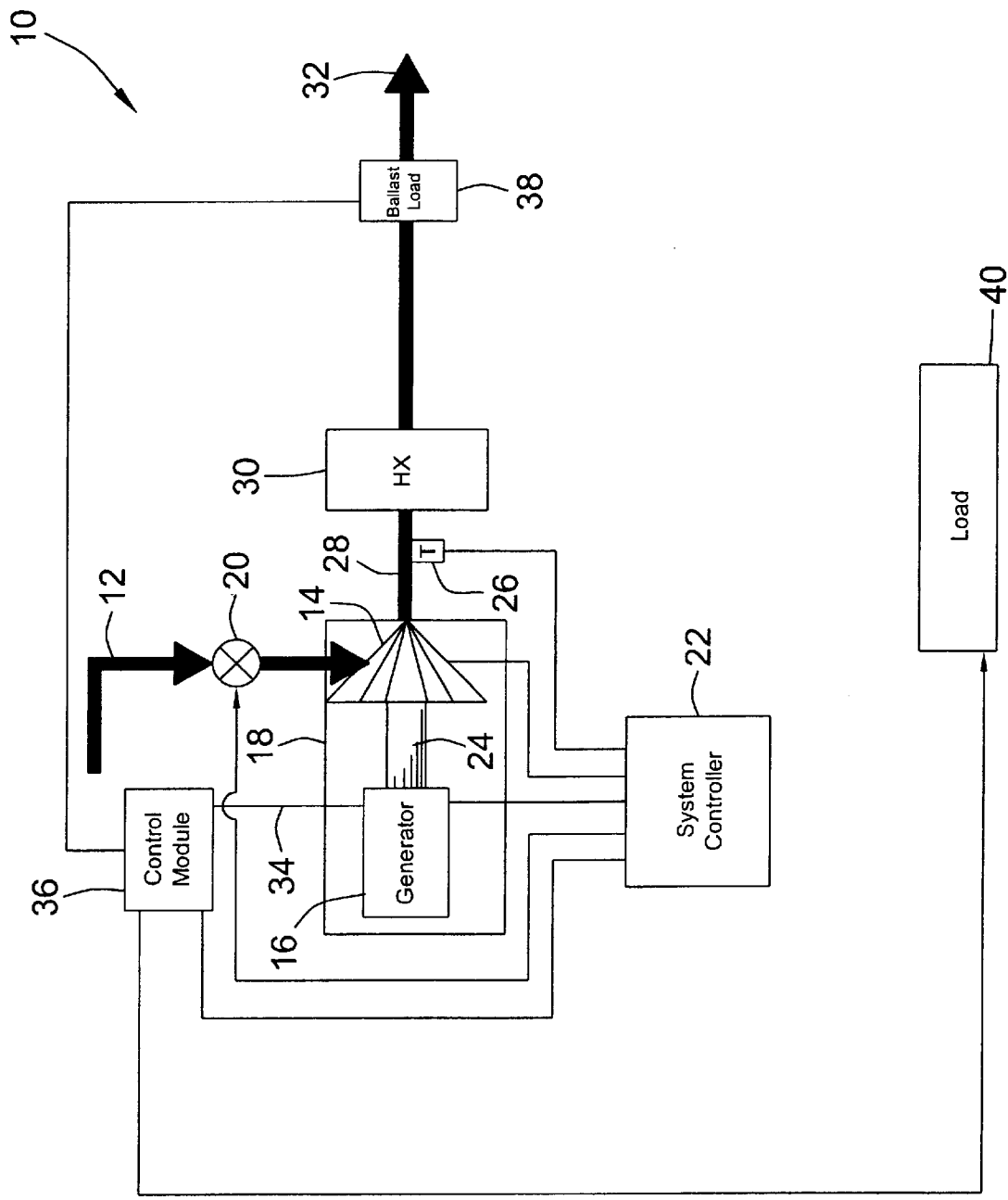
FIG. 1 is a simplified system level block diagram of a cooling and power system including the ballast load control system of the present invention.

As applied to an airborne fighter application, the system of the present invention as illustrated in FIG. 1 enables the generation of an amount of cooling necessary to allow the electronic equipment to operate properly. This underlying cooling system 10 provides, in one embodiment, at least 14 KW of cooling using bleed air 12 from an engine (not shown) as the energy source. However, it should be noted that other sources of gas, e.g. bottled gas, hydrazine decomposition, compressed gas, etc., may be used as appropriate or desired as will be recognized by those skilled in the art. Therefore, while the following discussion will refer to this source of gas as being bleed air from the engine, such a source should be taken as exemplary only and merely to simplify the discussion. Preferably, an expansion turbine 14 is used to provide the required temperature reduction of the bleed air 12 from the engine. To ensure that there is adequate loading on this expansion turbine, the system utilizes a permanent magnet generator 16 driven by the expansion turbine 14. This is the mechanism that provides the required load on the expansion turbine 14 to enable the supply of the required cooling. Such an assembly is commonly termed a turbo-generator 18 as will be understood by one skilled in the art.

To aid in an overall understanding of the operation of the ballast load control system of the present invention as it interacts with the cooling and power system, we turn first to the simplified illustration of FIG. 1. As shown in this simplified diagram, the gas inlet 12 is controlled through a modulating valve 20 that is controlled by system controller 22 based on the output cooling requirements of this cooling system 10. This gas 12 is used to drive the expansion turbine 14, which, through shaft 24, drives the generator 16. Through the expansion turbine 14, the gas 12 experiences a temperature loss such that the temperature sensed by temperature probe 26 is less than the temperature of the gas 12. This cool air 28 flows through heat exchanger 30 to remove heat therefrom.

While not shown in this simplified illustration of FIG. 1, the heat exchanger 30 is functionally coupled to the electronic equipment from which it is to remove heat. As will be understood by those skilled in the art, this heat exchanger 30 may represent a single or a plurality of individual components from which heat is to be removed, as well as more sophisticated heat exchange systems in communication through a thermal medium with the components from which heat is to be removed. Such systems include liquid cooling systems that may flow through a thermal circuit coupling multiple components. Once the air has passed through the heat exchanger 30, it is exhausted from the system as illustrated by arrow 32.

As indicated above, the generator 16 of the turbo-generator assembly 18 is coupled to the expansion turbine 14 to provide the necessary loading of turbine 14 such that a temperature drop may be experienced thereacross. In an embodiment of the present invention, the generator 16 is of a permanent magnet type whose output voltage characteristic is proportional to the input speed at which it is driven. During operation, the output power 34 is controlled by the system controller 22 through a control module 36. This control module 36 controllably couples the output 34 to a ballast load 38 and to utilization equipment 40. It should be noted, that the coupling of the output power 34 to the utilization equipment 40 through control module 36 is controlled by system controller 22 such that the output power 34 is always available to load 40 as long as this power is within acceptable power quality standards. That is, once the turbo-generator 18 has reached it minimum operational speed the control module 36 is commanded by system controller 22 to couple the output power 34 to the utilization equipment 40. This coupling is maintained during operation until the turbo-generator 18 is shut down, or until the power quality of this output power 34 deviates beyond an acceptable range.

The control of the coupling of the electric power 34 to the ballast load 38, however, differs significantly from the control of the power to utilization load 40. That is, the system controller 22 coordinates operation and coupling of the output power 34 to the ballast load 38 through control module 36 with the system cooling requirements of the overall system 10. This coordination ensures that a required amount of loading of the expansion turbine 14 necessary to meet the cooling requirements of the system 10 is provided by generator 16. During operation, the system controller 22 varies the total amount of connected load to generator 16 by effectively increasing or decreasing the amount of ballast load 38 connected to the system. This effective increase or decrease of ballast load 38 is also coordinated with the output requirements of the utilization equipment 40 such that, regardless of the necessary loading for turbine 14, the output power quality to the utilization equipment 40 always remains within acceptable limits.

As an example, assume that a steady state condition has been achieved in the system 10 such that a required amount of cooling to heat exchanger 30 is being provided with a given amount of electrical load (a combination of ballast load 38 and utilization equipment load 40) coupled to generator 16 through control module 36. Now assume that an increase in the amount of cooling is needed. The system controller 22 will command the modulating valve 20 to open such that an increased flow of gas 12 may be supplied to the expansion turbine 14. This increased flow of gas 12 will result in an increased speed of the turbine 14, and, through shaft 24, an increased speed of the permanent magnet generator 16. Since the output power generation of a permanent magnet generator is directly proportional to its input speed, the output voltage 34 will begin to rise. If left unchecked, this increased speed could result in an over voltage condition being supplied to the utilization equipment 40. However, as discussed above, system controller 22 would not allow such out-of-tolerance voltage to be supplied to the utilization equipment 40, and so would command control module 36 to disengage or disconnect the output power from the utilization equipment 40. However, this reduction in electrical load would result in a reduction in turbine loading, and would thus decrease the expansion turbine's ability to supply the increased need for cooling.

To prevent such a situation from occurring, the system controller 22 commands control module 36 to increase the effective electrical load supplied by ballast load 38. In this way, increased current flow to ballast load 38 will suppress the output voltage from generator 16. By increasing the power drawn from generator 16, a proper load may be maintained on expansion turbine 14 such that the increased gas flow will result in an increased amount of cooling provided to heat exchanger 30.

Conversely, when the system controller 22 determines that the amount of cooling may be reduced, the modulating valve 20 is controlled to reduce the amount of gas 12 supplied to the expansion turbine 14. If no adjustment to the connected electrical load is made, the loading on the turbine will become excessive for the amount of cooling required, and will again adversely affect the performance of the system 10. Additionally, with the reduced speed of the expansion turbine 14, the output voltage of generator 16 will begin to droop under the connected electrical load. Such may result in an under voltage condition being supplied to the utilization equipment 40, which will again trigger the protective function of system controller 22 to completely disconnect the utilization equipment 40 from the generator 16. This will, of course, result in an undesired loss of power to the utilization equipment 40. To prevent this situation from happening, the system controller 22 again actively controls control module 36 to reduce the amount of ballast loading 38 coupled to generator 16. In this way, the output voltage at 34 may be maintained within acceptable ranges despite the reduction in input speed caused by the reduced cooling needs of the system 10.

Further, at any given cooling level, an increase or decrease in the power demanded by the utilization equipment will also affect the ability of the cooling system to meet its cooling requirements. Also, until a speed increase or decrease can be accomplished, the change in electrical loading may cause the output voltage of the PMG to rise or fall out of acceptable limits. To prevent this, the system controller 22 commands the control module 36 to increase or decrease the power draw of the ballast load 38 in inverse proportion to the power demand from the utilization equipment 40.

Figure 2:
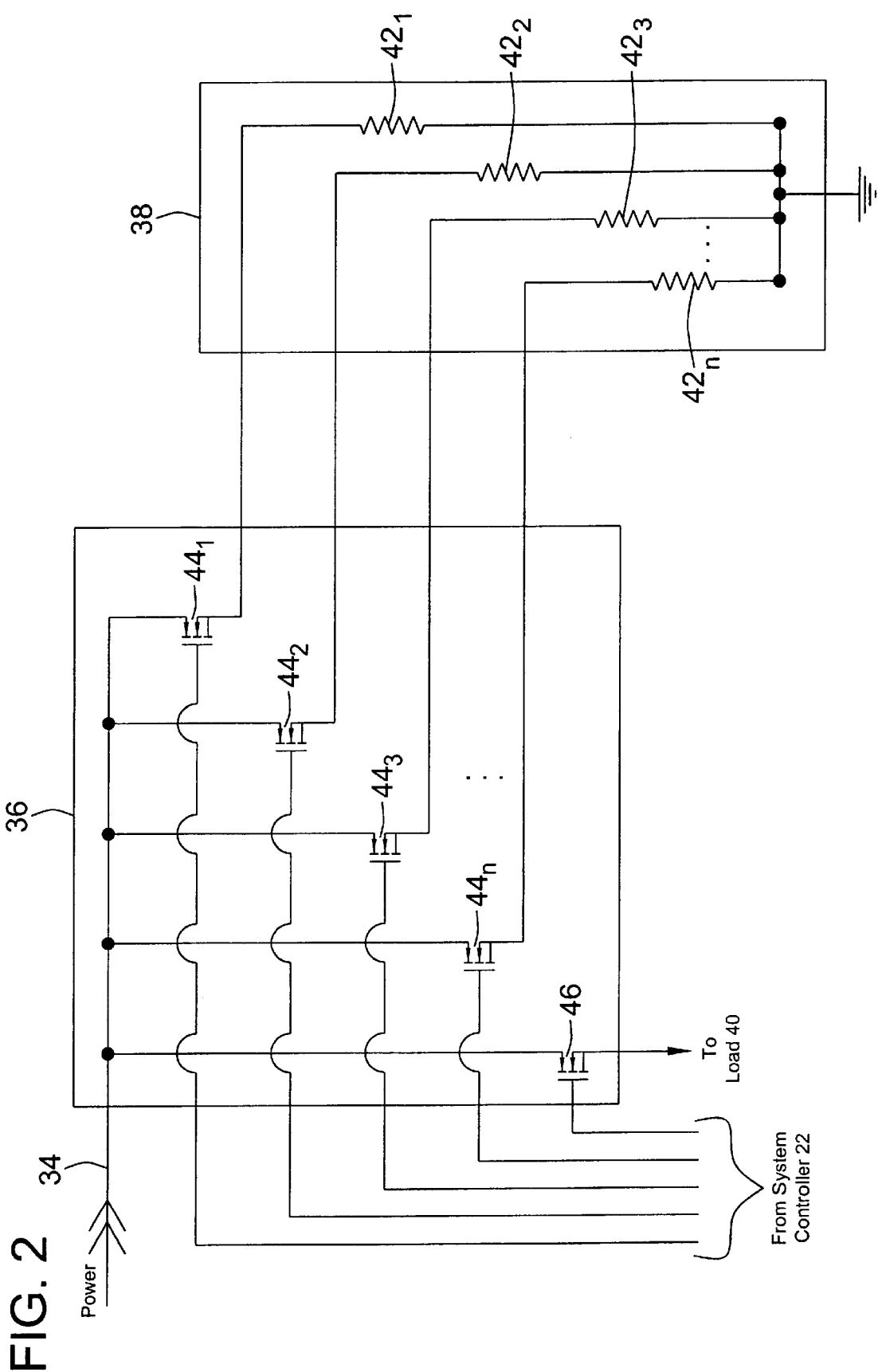
FIG. 2 is a simplified single line schematic diagram of an embodiment of the ballast control system of the present invention.

The construction of control module 36 may vary depending on the type of ballast load 38 employed in the system of the present invention. One embodiment of the control module 36 and the ballast load 38 is illustrated in FIG. 2. In this embodiment, the ballast load 38 includes a plurality of resistive elements $42_1, 42_2, \ldots 42_n$ coupled in parallel with one another. With such a ballast load 38, the control module 36 implements a series of control switches $44_1, 44_2, \ldots 44_n$, each coupled to an individual resistive element of ballast load 38 to control the power flow thereto. The control of these individual switches comes from the system controller 22 as discussed above. As additional electrical load is required, the system controller 22 commands additional control switches to close, thereby effectively reducing the impedance provided by ballast load 38 to thereby increase the current flow from generator 16. Conversely, when system controller 22 requires that the electrical load be reduced, it commands an appropriate number of control switches 34 to open such that the effective impedance provided by ballast load 38 increases, thereby decreasing the electrical current that is sourced by the generator 16. The value of the resistive elements may be identical, or they may be scaled to allow more precise control of the output power.

The control module 36 also includes a controlled switch 46 that may be used to connect and isolate the flow of power 34 to the utilization equipment load 40 based on the power quality and the operational profile sensed by the system controller 22. It will be understood by those skilled in the art that while FIG. 2 illustrates the ballast load 38 as including only resistive elements, that the actual impedance of these elements may include reactive components if desired to compensate for the impedance of the utilization equipment load 40, or for other reasons as desired or appropriate. Likewise, while FIG. 2 illustrates the controlled switches 44 of control module 36 as being insulated gate bipolar transistors (IGBTs), one skilled in the art will recognize that these control switches may take other forms as appropriate or desired, including GTOs, MOFSFETs, back to back silicon controlled rectifiers (SCRs), etc. Additionally, one skilled in the art will recognize that remotely controlled electro-mechanical devices such as remote control circuit breakers (RCCBs) or relays may also be used in this embodiment if the switching speed of these devices is sufficient to maintain power quality standards. However, the use of such slower switching mechanical type devices may not be appropriate when the utilization equipment load 40 is a switched type load such as, for example, a radar. With such loads, rapid adjustment to the amount of ballast load provided is needed in response to the switched utilization equipment load turning on and off.

Figure 3:
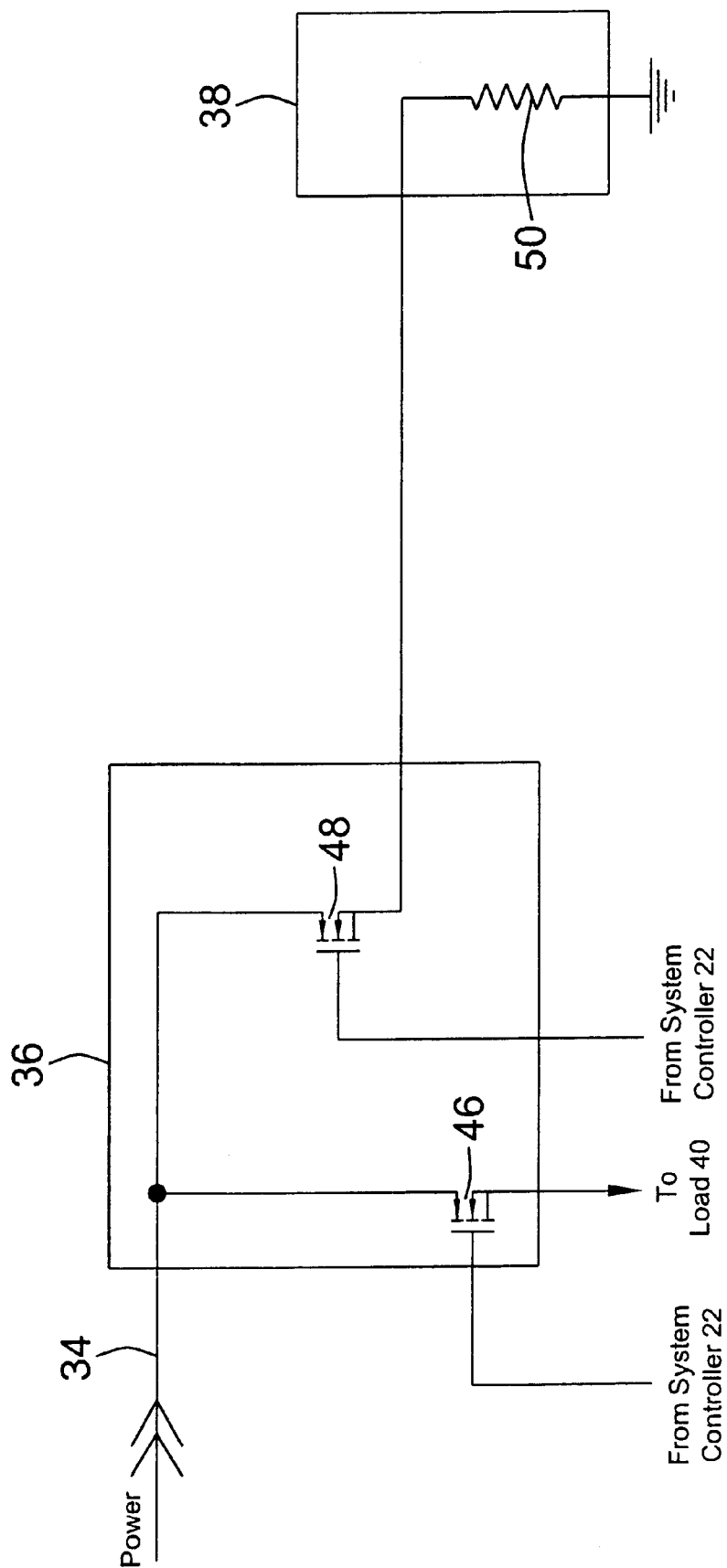
FIG. 3 is a simplified single line schematic diagram of an alternate embodiment of the ballast load control system of the present invention.

An alternate embodiment of the control module 36 and ballast load 38 is illustrated in FIG. 3. As may be seen from this simplified single line diagram of this embodiment of the invention, the control module 36 includes only a single controlled switching element 48 that selectively couples and decouples the electric power 34 to a single element 50 in the ballast load 38. In this embodiment, the control from system controller 22 is a pulse width modulated (PWM) control signal that effectively increases or decreases the amount of electrical load coupled to generator 16. That is, as the amount of electrical load needs to be increased, the system controller 22 increases the duty cycle of the PWM control signal to switching element 48, which affectively increases the amount of load supplied by generator 16. Conversely, when system controller 22 determines that the amount of electrical load coupled to generator 16 needs to be decreased, the duty cycle of the PWM control signal from controller 22 is decreases such that the generator 16 effectively supplies less coupled load. As with the above, one skilled in the art will recognize that, while switching element 48 is illustrated as an IGBT, other electronic switching components may be employed, provided their switching characteristics and current carrying capacity are acceptable based on the actual loading requirements of the system.

Figure 4:
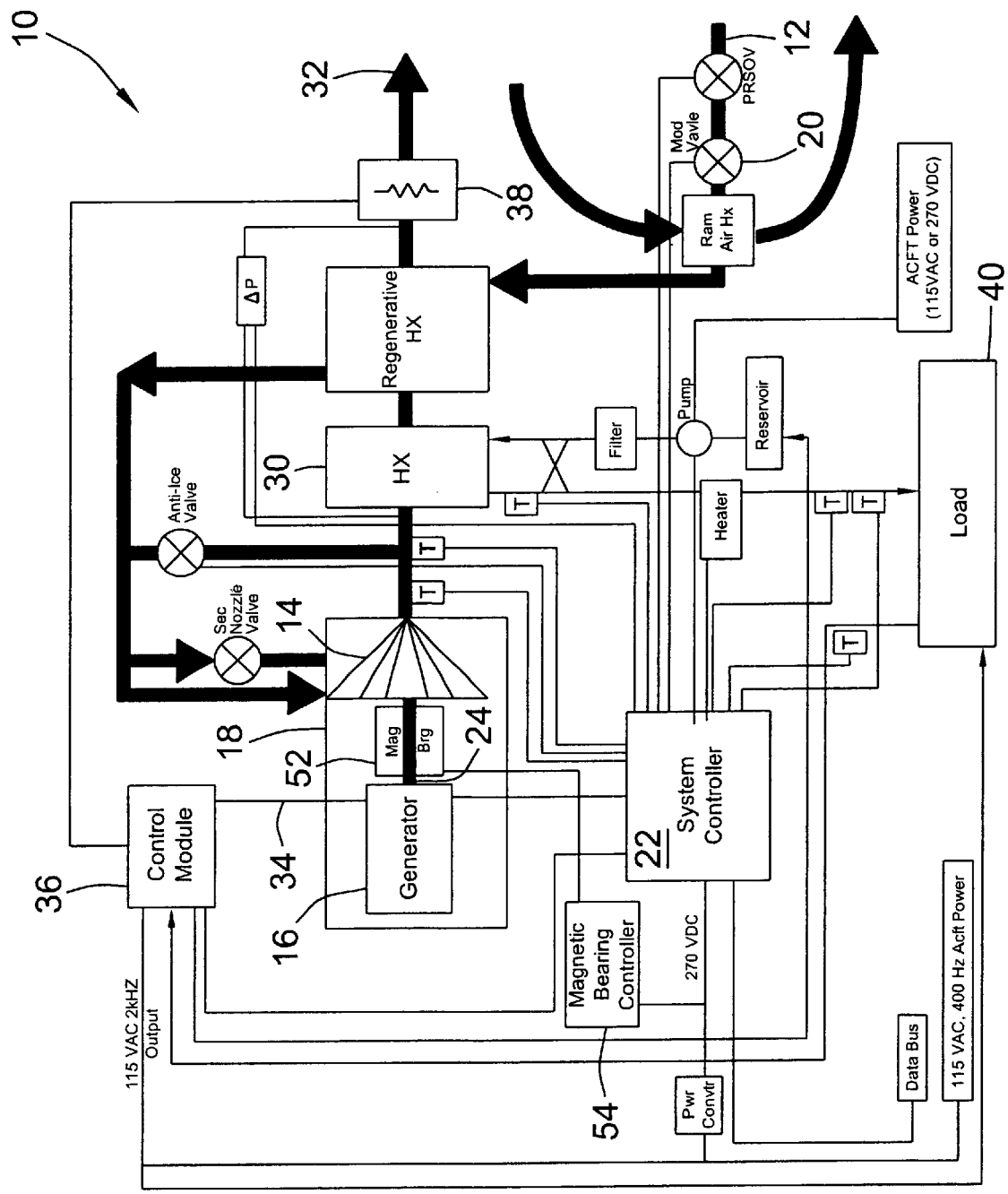
FIG. 4 is an expanded single line block diagram illustrating the ballast load control system of the present invention as applied to a cooling and power system for an aircraft.

Turning now to a more detailed exemplary application of the ballast load control system of the present invention, FIG. 4 illustrates an entire cooling and power system incorporating the instant invention. The system 10 in this exemplary application operates at high speed to reduce the overall weight of the system. Because of the criticality of this exemplary system, it must be highly reliable with a minimized requirement for maintenance. Therefore, magnetic bearings 52 are used in a preferred embodiment to support the turbo-machinery shaft 24 because they enhance the overall reliability of the system 10 and because they are ideal for high-speed turbo-machinery applications. The power for these magnetic bearings is also derived by the generator 16, once the expansion turbine 14 reaches a minimum operational speed. The structure and control of these magnetic bearings 52 are described in co-pending application Ser. No. 09/939,469, entitled Permanent Magnet Turbo-Generator Having Magnetic Bearings, filed on even date herewith, the teachings and disclosure of which are hereby incorporated in their entireties herein by reference thereto.

In this exemplary application the system 10 provides both cold air for a radar PAO cooling loop 30 and electrical power for the radar 40. The system is essentially self-contained except for the gas connection 12, a start-up/shut-down electric power connection and a hot air exhaust. The turbo-generator system includes five separate line-replaceable units (LRUs), including the turbo-generator 18, the magnetic bearing controller 54, the system controller 22, the ballast load control module 36, and the ballast load module 38.

The turbo-generator 18 is a radial inflow turbine 14 and with a permanent magnet generator 16. The turbine 14 and generator 16 are mounted on a single shaft 24 that is supported by magnetic bearings 52. The machine 18 includes rotor containment for the high-energy rotors. The magnetic bearing center section uses an axial split feature to allow replacement of the shaft and wheel assembly using common hand tools, thereby providing for high maintainability. This dramatically reduces overhaul time if service is required. The turbo-generator 18 uses a dual area nozzle turbine to reduce gas consumption when cooling demand and gas conditions permit.

The generator 16 in one embodiment is a permanent magnet design. This brushless AC generator includes a permanent magnetic rotor and two, three-phase windings, 30° displaced, wound on a stator. The magnetic flux from the PMG rotor induces voltage in the stator winding when its flux sweeps the stator. The magnitude of the AC voltage depends upon the rotor and stator geometry, materials, and speed. With the rotor and stator geometry and materials selected, the AC voltage becomes directly proportional to the rotor speed. The generator air gaps are coordinated with the magnetic bearing air gaps to provide stable operation during start-up and full load operation.

The turbo-generator shaft 24 is supported by active magnetic bearings 52 to provide optimum stiffness and damping characteristics for desired rotordynamic response at all operating speeds and specified environmental conditions from rest to maximum design speed. The magnetic bearings 52 will provide long, maintenance-free life and improved overall efficiency. Initial power for the magnetic bearings is supplied from the aircraft power system. However, once the turbo-generator system reaches operational speed, this power is supplied by the permanent magnet generator 16. Backup bearings (not shown) are also incorporated to provide shaft support after shutdown and for limited periods during operation in case of electrical power supply or controller malfunction.

The system controller 22 houses the necessary electronic circuitry to control the phase angle firing of the power conditioning and ballast load control unit's switches, and to provide system protection features such as overvoltage/ undervoltage, overload protection, etc. as discussed above. The system controller regulates the output of the generator to provide power to the radar, and provides magnetic bearing and control power. Other loads used to supplied as needed or desired in other embodiments. The system controller 22 is used to control the overall system operation including valve operation, generator operation, magnetic bearing operation, PAO temperature control, and failure detection and reporting. The controller hardware preferably utilizes a digital system controller.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of providing controlled turbine loading in a turbo-generator based cooling system, comprising the steps of:
    monitoring an output voltage of the turbo-generator;
    selectively coupling a ballast load to an electrical output of the turbo-generator to maintain the output voltage at a predetermined level.

2. The method of claim 1, wherein the step of selectively coupling the ballast load comprises the step of increasing the ballast load in response to an increase in the output voltage of the turbo-generator.

3. The method of claim 2, wherein the ballast load comprises a plurality of parallel coupled ballast load elements, and wherein the step of increasing the ballast load comprises the step of coupling at least one additional ballast load element to the electrical output of the turbo-generator.

4. The method of claim 2, wherein the step of selectively coupling the ballast load comprises the step of pulse-width modulating at a duty cycle the coupling of the ballast load to the electrical output, and wherein the step of increasing the ballast load comprises the step of increasing the duty cycle of the pulse-width modulated coupling.

5. The method of claim 1, wherein the step of selectively coupling a ballast load comprises the step of decreasing the ballast load in response to an decrease in the output voltage of the turbo-generator.

6. The method of claim 5, wherein the ballast load comprises a plurality of parallel coupled ballast load elements, and wherein the step of decreasing the ballast load comprises the step of disconnecting at least one of the ballast load elements from the electrical output.

7. The method of claim 5, wherein the step of selectively coupling the ballast load comprises the step of pulse-width modulating at a duty cycle the coupling of the ballast load to the electrical output, and wherein the step of decreasing the ballast load comprises the step of decreasing the duty cycle of the pulse-width modulated coupling.

8. The method of claim 1, wherein the step of selectively coupling the ballast load comprises the step of decreasing the ballast load in response to an increase in power demand from the turbo-generator by utilization equipment coupled thereto.

9. The method of claim 1, wherein the step of selectively coupling the ballast load comprises the step of increasing the ballast load in response to a decrease in power demand from the turbo-generator by utilization equipment coupled thereto.

10. The method of claim 1, wherein the step of selectively coupling the ballast load comprises the step of increasing the ballast load in response to an increase in air flow to a turbine of the turbo-generator.

11. The method of claim 1, wherein the step of selectively coupling the ballast load comprises the step of decreasing the ballast load in response to a decrease in air flow to a turbine of the turbo-generator.

12. A ballast load system for use with a turbo-generator having a gas driven turbine drivably coupled to an electric generator, the electric generator producing an electrical output upon operation of the turbine, comprising:
    a ballast load module;
    a control module having an input for receiving the electrical output of the generator, and an output coupled to the ballast load module; and
    a system controller having a first sensory input to sense the electrical output of the generator, the system controller commanding the control module to selectively couple the ballast load module to the input thereby varying an electrical load connected to the generator to maintain the electrical output of the generator at a predetermined level.

13. The ballast load system of claim 12, wherein the ballast load module comprises a plurality of parallel load elements, and wherein the control module comprises a plurality of parallel switching elements associated with the plurality of parallel load elements.

14. The ballast load system of claim 13, wherein the system controller commands the control module to close at least one additional switching element in response to an increase of voltage level of the electrical output.

15. The ballast load system of claim 13, wherein the system controller commands the control module to open at least one switching element in response to a decrease of voltage level of the electrical output.

16. The ballast load system of claim 12, wherein the ballast load module comprises a single load element, and wherein the control module comprises a controllable switching element, and wherein the system controller pulse-width modulates the controllable switching element to effectively vary the electrical load connected to the generator.

17. The ballast load system of claim 16, wherein the system controller increases a duty cycle of the pulse-width modulation of the controllable switching element in response to an increase of voltage level of the electrical output.

18. The ballast load system of claim 16, wherein the system controller decreases a duty cycle of the pulse-width modulation of the controllable switching element in response to a decrease of voltage level of the electrical output.

19. The ballast load system of claim 12, wherein the systems controller further controls an amount of gas to the turbine, and wherein the system controller commands the control module to selectively couple the ballast load module to the input thereby varying the electrical load connected to the generator in proportion to the amount of gas to the turbine.

20. The ballast load system of claim 12, wherein the control module further includes a second output adapted to supply electrical power to utilization equipment coupled thereto, and wherein the system controller commands the control module to vary the electrical load in inverse proportion to the electrical power supplied to the utilization equipment.

21. A cooling and electric power generation system, comprising:

a turbo-generator having a gas driven turbine drivably coupled to an electric generator, the electric generator producing an electrical output upon operation of the turbine, the turbine reducing a temperature of the gas;

a ballast load module;

a control module having an input for receiving the electrical output of the generator, a first output coupled to the ballast load module, and a second output adapted to couple to utilization equipment; and a system controller having a first sensory input to sense the electrical output of the generator, the system controller commanding the control module to selectively couple the ballast load module to the input thereby varying an electrical load connected to the generator to maintain the electrical output of the generator at a predetermined level.

22. The system of claim 21, further comprising an input gas modulating valve, and wherein the system controller controls the modulating valve to vary an amount of cooling provided by the turbine, the system controller commanding the control module to vary the electrical load in proportion to the variation of the amount of cooling provided by the turbine.

23. The system of claim 21, wherein the system controller commands the control module to vary the electrical load in inverse proportion to an amount of electric power drawn by the utilization equipment.

24. The system of claim 21, wherein the ballast load module comprises a plurality of parallel load elements, and wherein the control module comprises a plurality of parallel switching elements associated with the plurality of parallel load elements.

25. The system of claim 21, wherein the ballast load module comprises a single load element, and wherein the control module comprises a controllable switching element, and wherein the system controller pulse-width modulates the controllable switching element to effectively vary the electrical load connected to the generator.

* * * * *